United States Patent [19]

Valster et al.

[11] Patent Number: 5,022,132
[45] Date of Patent: Jun. 11, 1991

[54] APPARATUS FOR ROTATABLY MOUNTING IDLERS AND PULLEYS OF VARIOUS SIZES

[75] Inventors: Karl C. Valster; Allen V. Reicks, both of Pella, Iowa

[73] Assignee: Precision Pulley, Inc., Pella, Iowa

[21] Appl. No.: 456,174

[22] Filed: Dec. 26, 1989

[51] Int. Cl.$^5$ .............................................. B21B 13/02
[52] U.S. Cl. ..................................... 29/116.1; 193/37
[58] Field of Search .................... 29/116.1, 110, 123, 29/124, 125; 193/35 R, 37; 198/780; 384/275, 276, 295, 418, 439

[56] References Cited

U.S. PATENT DOCUMENTS

| | | | |
|---|---|---|---|
| 2,169,623 | 8/1939 | Weiss et al. | 29/116.1 X |
| 3,198,318 | 8/1965 | Brown | 384/480 |
| 3,345,115 | 10/1967 | Olender et al. | 384/487 |
| 3,406,438 | 9/1966 | Reilly | 29/116.1 |
| 3,984,160 | 10/1976 | Sheldon et al. | 384/484 |
| 4,029,206 | 6/1977 | Dillon | 198/830 |
| 4,099,487 | 7/1978 | Wouters | 29/116.1 X |
| 4,142,281 | 3/1979 | Müller | 29/116.1 |
| 4,233,853 | 11/1980 | Holz | 474/185 |

OTHER PUBLICATIONS

Copy of pp. 1, 4, 5, 12 and 13 of Precision Idler Co. brochure entitled Belt Conveyor Idlers-Dimensions and Engineering Manual PIC 89212M.
Copy of four-page brochure entitled "HDW" Wing Self Cleaning of Precision Pulley Inc.

Primary Examiner—Joseph M. Gorski
Assistant Examiner—S. Thomas Hughes
Attorney, Agent, or Firm—Henderson & Sturm

[57] ABSTRACT

An apparatus for rotatably mounting idlers and pulleys of various sizes, including an idler or pulley for engaging the underside of a conveyor belt. The idler or pulley includes a cylindrical chamber in each end for reception of bearing assemblies therein. Each of the bearing assemblies in each end of the idler or pulley has a stub shaft therein. An elongated member which is tubular, at least at each end thereof, is press fit onto the inner ends of each of the stub shafts whereby the length of the elongated member can be chosen depending upon the length of the idler or pulley, while at the same time identical standard bearing assemblies and stub shafts can be used for idler pulleys of various sizes.

8 Claims, 2 Drawing Sheets

APPARATUS FOR ROTATABLY MOUNTING IDLERS AND PULLEYS OF VARIOUS SIZES

TECHNICAL FIELD

The present invention relates generally to an apparatus for rotatably mounting idlers and pulleys of various sizes and more particularly to such an apparatus which utilizes standard size stub shafts disposed in a modular bearing assembly to form modular bearing units whereby two of such identical modular bearing units can be used to rotatably mount idlers and pulleys of various sizes by merely utilizing an elongated member therebetween which is of a predetermined length depending upon the size of the idler or pulley to be rotatably mounted.

BACKGROUND ART

Idlers and pulleys used in conjunction with conveyor belts typically utilize a solid shaft journalled to each end of an idler or pulley by bearings. For example U.S. Pat. No. 3,198,318 to Brown and U.S. Pat. No. 3,345,115 to Olender et al show roller bearing assemblies mounting an idler to a shaft. U.S. Pat. No. 3,984,160 to Sheldon et al shows ball bearing assemblies mounting an idler to a shaft.

In each of the patented devices referred to above, the length of the shaft will need to change depending upon the length of the idler to be used. Consequently, if many different idler and pulley sizes are used, this will require a very large inventory of shafts. To the extent that the diameter of the shafts differ, it will also require a large inventory of bearing assembly parts. Of course large inventories of parts cost money. The alternative is not very attractive either, namely, having a small inventory to reduce operating costs is to risk not having the necessary part on hand when it is needed.

Consequently, there is a need for an apparatus for rotatably mounting idlers and pulleys of various sizes which can reduce the inventories needed while at the same time providing all of the parts necessary for rotatably mounting idlers and pulleys of various sizes when these parts are needed.

DISCLOSURE OF THE INVENTION

The present invention relates generally to an apparatus for rotatably mounting idlers and pulleys of various sizes, including an idler or pulley for engaging the underside of a conveyor belt. The idler or pulley includes a cylindrical chamber in each end for reception of bearing assemblies therein. Each of the bearing assemblies in each end has a stub shaft therein. An elongated member which is tubular, at least at each end thereof, is press fit onto the inner ends of each of the stub shafts whereby the length of the elongated member can be chosen depending upon the length of the idler or pulley, while at the same time identical standard bearing assemblies and stub shafts can be used for idlers and pulleys of various sizes.

An object of the present invention is to provide an improved apparatus for rotatably mounting idlers and pulleys.

Another object of the present invention is to provide an apparatus for rotatably mounting idlers and pulleys of various sizes wherein the bearing assemblies and stub shafts disposed therein can essentially be identical whereby the length of an elongated member interconnecting the stub shafts can be chosen depending upon the length of the idler or pulley.

A further object of the present invention is to provide an apparatus for rotatably mounting idlers and pulleys which is so universal that it requires a much smaller inventory of parts than similar devices in the prior art.

A still further object is to provide a way to improve shaft weight and cost savings.

Another object is to provide a utilized shaft end, bearing and seal module suitable for large quantity assembly methods and reduced final assembly time requirements.

Other objects, advantages, and novel features of the present invention will become apparent from the following detailed description of the invention when considered in conjunction with the accompanying drawings.

BEST MODE FOR CARRYING OUT THE INVENTION

Figure 1:
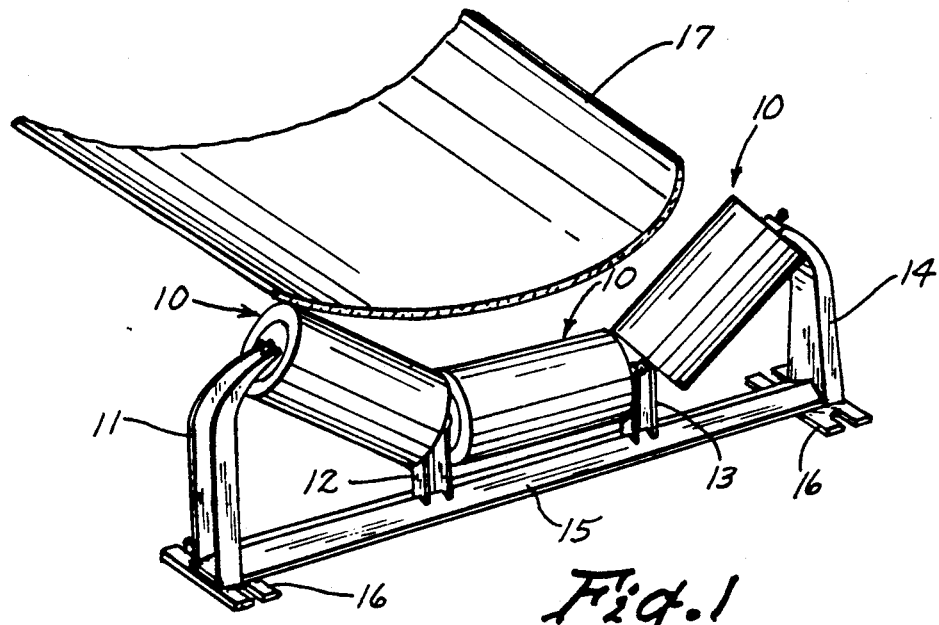
FIG. 1 is a perspective view of three idlers rotatably attached to support the underside of a conveyor belt.

Referring now to the drawings wherein like reference numerals designate identical or corresponding parts throughout the several views, FIG. 1 shows three idlers (10) rotatably mounted to upstanding vertical members (11), (12), (13) and (14) which are rigidly secured to a cross member (15) with flanges (16) disposed on each end thereof which can be bolted down to a solid and rigid framework (not shown). A flexible conveyor belt (17) is shown in FIG. 1 to extend over the idlers (10) so that the idlers (10) will support the conveyor belt (17) and consequently will support any load or material disposed on top of the conveyor belt (17).

A cylindrical chamber (20) is formed in each end of the idler (10) and the wall (20) has a tapered portion (21) and a smaller restricted portion (22).

Figure 2:
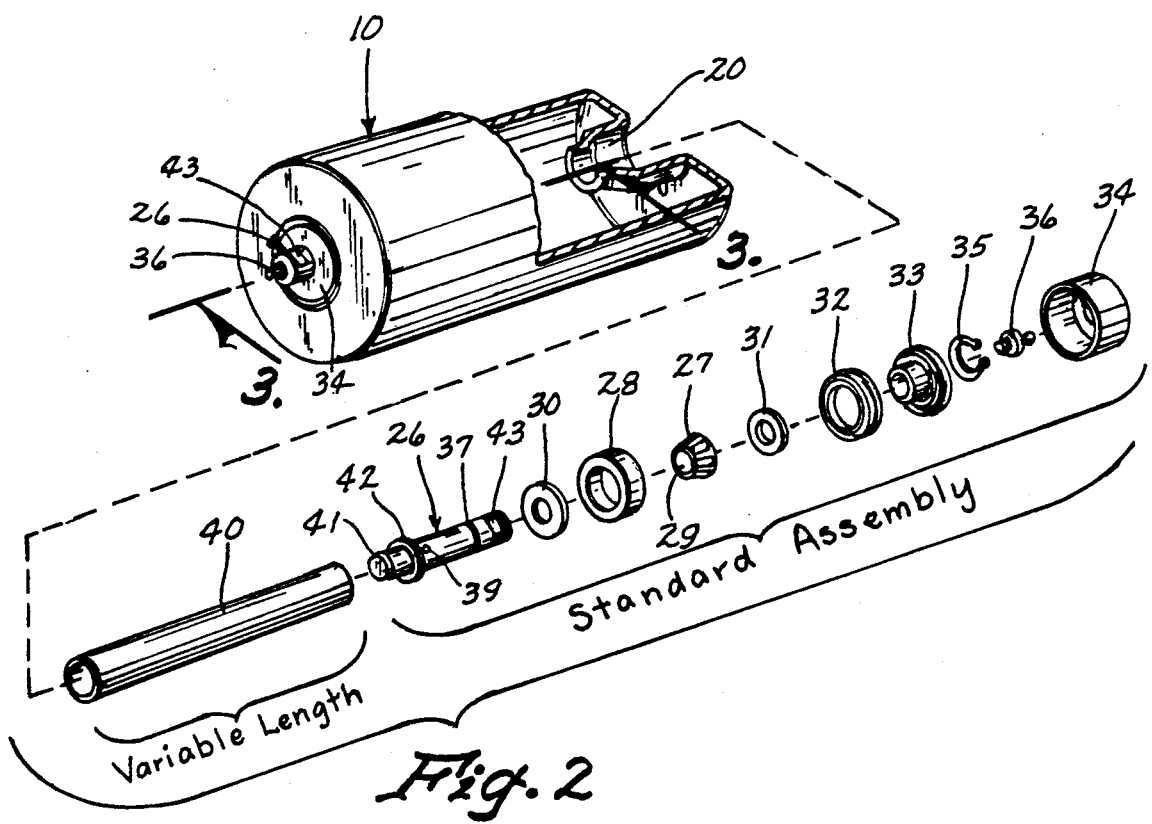
FIG. 2 is a perspective, exploded view of one of the idlers of FIG. 1 having a portion of the idler cut away to show how the bearing assemblies are mounted into one end thereof.
Figure 3:
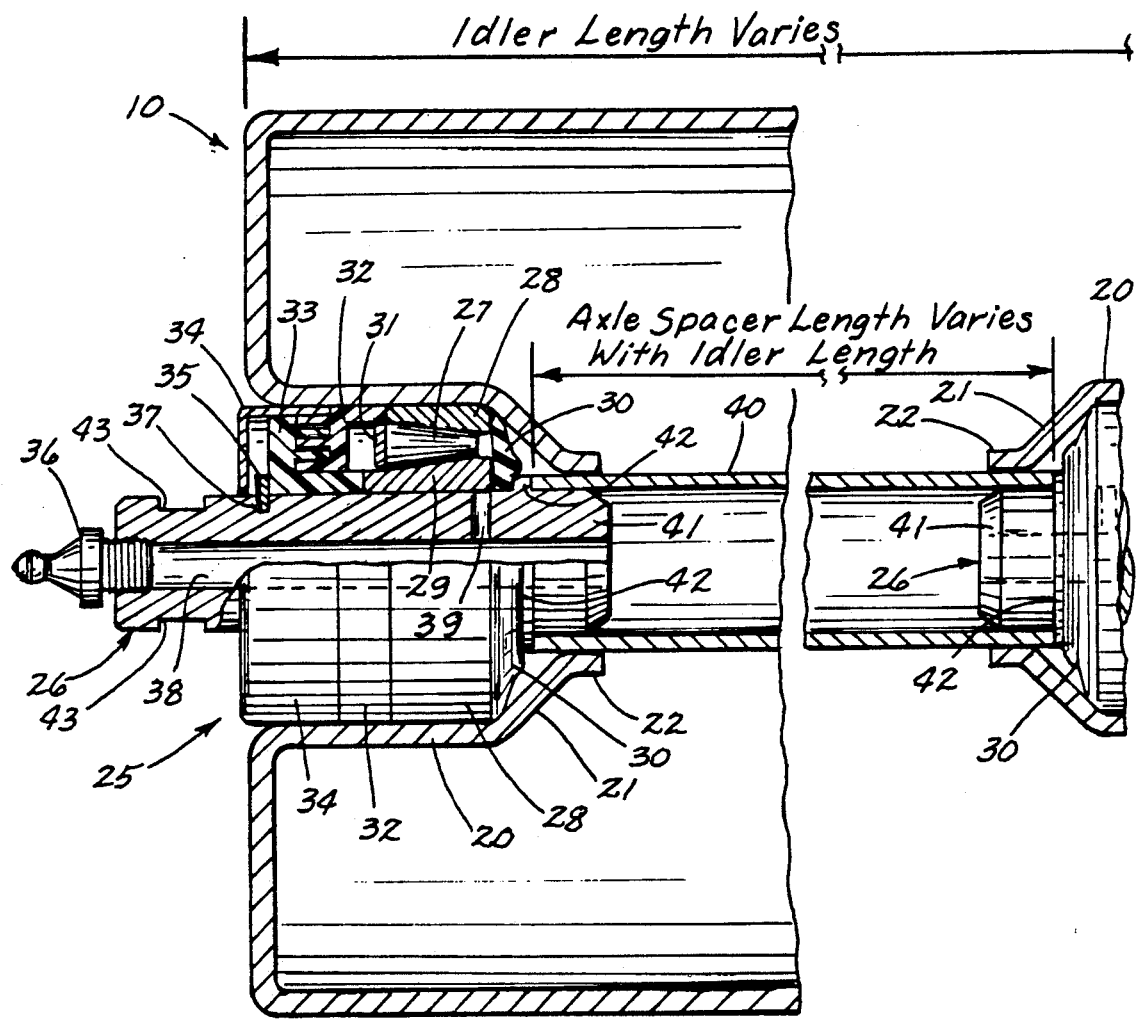
FIG. 3 is an enlarged partial cross sectional view taken along line 3—3 of FIG. 2 and showing how the roller bearing assemblies are mounted in each end of the idler with standard stub shafts and with a variable length elongated member interconnected therebetween.

A modular bearing unit (25), as shown in FIGS. 2 and 3 constitutes a standard assembly including a stub shaft (26) mounted on roller bearings (27). Bearing cups (28) are pressed into the opening of wall (20) so tightly that they remain fixed with respect to the wall (20). Alternatively, they can be welded in place. The other parts of the standard assembly bearing unit (25) are disposed on the stub shaft (26) as is shown in FIG. 3.

The roller bearing (27) has an inner race (29) so that the rollers (27), rotatably mounted with respect to the inner race (29), roll inside the bearing cup (27) in a conventional fashion. An inner rubber or synthetic plastic seal (30) is disposed onto the stub shaft (26) just before placement of the bearing cone, including the inner race (29) and roller (27).

Referring again to FIGS. 2 and 3, it is noted that a bearing cage ring (27) also forms a part of the bearing cone which is conventional in the bearing art. A grease purgable contact seal is located against bearing cone. A labyrinth ring is constructed of an inner labyrinth ring

(32) and an outer labyrinth ring (33). A snap ring (35) extends into a groove (37) in the stub shaft (27) and holds the entire assembly, including elements (27, 29, 30, 31, 32 and 33), in place on the stub shaft (26). This snap ring can be of a wavy design to allow preload when compressed and to provide additional tolerance compensation in assembly. A spring, bellville washer or wave spring can be sandwiched between the snap ring (37) and the labyrinth for the same purpose. In both cases a preload develops as the stub shaft is installed in the tube (40). A dust cap (34) is placed over the top of the outer labyrinth ring (33) as is shown in FIG. 3.

A grease fitting (36) is threadably engaged into one end of the passageway (38) in the stub shaft (26) so that grease entering the passageway (38) will pass through passageway (39) and past the space between the inner race (29) and the inner seal (30) to thereby allow grease to flow to the roller bearings (27).

The inner end (41) of the stub shaft (26) can be solid to have the passageway (38) closed so that grease will not pass into the tube (40) for the purpose of merely conserving the amount of lubricant or grease used. The stub shaft (26) has an annular ring (42) which abuts the end of the tube (40) on one side and which abuts the inner seal (30) on the other side thereof. Flattened areas (43) on the outer ends of the stub shafts (26) permit the stub shafts to be mounted so that they do not rotate with respect to the upstanding vertical members (11), (12), (13) and (14) to which they are mounted.

Consequently, the standard assemblies or bearing units (25) can be essentially all identical so long as each of the pulleys or idlers (10) have a configuration like walls (20), (21) and (22). Of course the stub shafts (26) and the bearing units (25) can be different than the ones shown in this preferred embodiment. For example, the bearings can be sealed ball bearings instead of roller bearings.

In order to mount an idler (10) using the assemblies of the present invention, an elongated member (40) is chosen based on the desired length of the idler (10). This elongated member (40) is the only part that needs to be stocked in various lengths. It is also possible to merely cut this tubular member (40) to a desired length as is needed, thereby just stocking long lengths of the tubing (40). Tubular member (40) is preferably drawn over mandrel (DOM) tubing. A standard assembly (25) is merely inserted in one end of idler (10). The tubular member (40) is then forced onto the inner end of the stub shaft that is so placed. The other standard bearing unit (25) is then placed in the other end, with the inner end of that respective stub shaft extending into the other end of the variable length tube (40), for example as shown in FIG. 3. The idler (10) can then be attached to the support members (11), (12), (13) or (14) in a conventional fashion.

Accordingly, it will be appreciated that the best mode disclosed herein does indeed accomplish the aforementioned objects. Obviously many modifications and variations of the present invention are possible in light of the above teachings, for example, the elongated member (40) could be of a different configuration and connect to the stub shafts (26) in a different way. It is therefore to be understood that, within the scope of the appended claims, the invention may be practiced otherwise than as specifically described.

I claim:

1. Apparatus used in conjunction with a conveyor belt, comprising:

hollow rotatable means having a longitudinal axis, a radial periphery and two ends, for engaging an underside of said conveyor belt, said hollow rotatable means being adapted to rotate about said longitudinal axis;

a first bearing assembly;

first cylindrical chamber means disposed external to and on one end of said rotatable means for reception of said first bearing assembly;

a second bearing assembly;

second cylindrical chamber means disposed external to and on the other end of said rotatable means for reception of said second bearing assembly;

a first stub shaft disposed in said first bearing assembly, said first stub shaft having an inner end and an outer end;

a second stub shaft disposed in said second bearing assembly, said second stub shaft having an inner end and an outer end;

an elongated member having a predetermined length located within said hollow rotatable means;

first attachment means on one end of said elongated member for forming a rigid attachment of said one end of said elongated member with said inner end of said first stub shaft such that said stub shaft is received within and in direct contact with said elongated member; and second attachment means on the other end of said elongated member for forming a rigid attachment of said other end of said elongated member with said inner end of said second stub shaft such that said second stub shaft is received within and in direct contact with said elongated member, whereby the length of said elongated member can be chosen depending upon the length of said rotatable means while at the same time identical standard bearing assemblies and stub shafts can be used for rotatable means of various sizes.

2. The apparatus of claim 1 wherein said elongated member is tubular.

3. The apparatus of claim 1 wherein said first attachment means comprises an annular wall on said one end of said elongated member which is in a press fit relationship over the inner end of said first stub shaft.

4. The apparatus of claim 1 wherein said second attachment means comprises an annular wall on said other end of said elongated member which is in a press fit relationship with the inner end of said second stub shaft.

5. The apparatus as in claim 1; wherein, said first and second external cylindrical chamber means are axially aligned along the longitudinal axis of the rotatable means and spaced from the radial periphery of the rotatable means.

6. The apparatus as in claim 5; wherein; the first and second external cylindrical chamber means comprise contoured recesses.

7. The apparatus as in claim 6; wherein each of the contoured recesses include; and enlarged outer portion; a tapered intermediate portion; and, a smaller apertured restricted inner portion.

8. The apparatus as in claim 7; wherein, the apertured inner portions are dimensioned to accept said elongated member.

* * * * *